UNITED STATES PATENT OFFICE.

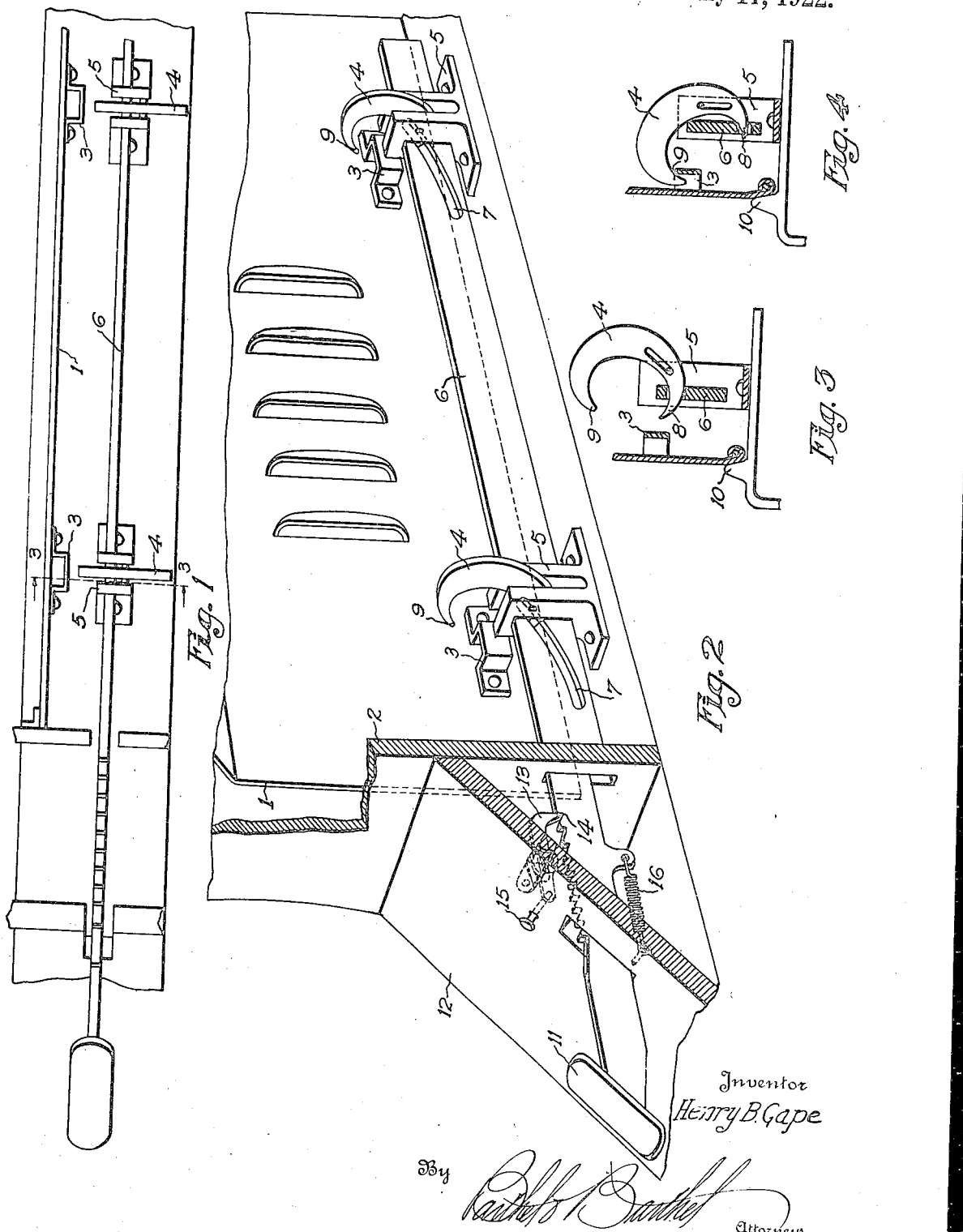

HENRY B. GAPE, OF DETROIT, MICHIGAN.

HOOD FASTENER.

1,422,691.  Specification of Letters Patent.  Patented July 11, 1922.

Application filed June 18, 1920. Serial No. 390,011.

*To all whom it may concern:*

Be it known that I, HENRY B. GAPE, a citizen of the United States of America, residing at Detroit, in the county of Wayne and State of Michigan, have invented certain new and useful Improvements in Hood Fasteners, of which the following is a specification, reference being had therein to the accompanying drawings.

My invention relates to locking means for automobile hoods, and has for its object the provision of a simple, easily operated, inexpensive device, located out of sight on the interior of the hood, by means of which the hood may be locked or unlocked at both ends by a single movement.

In the drawings;

Figure 1 is a plan view of a portion of an automobile hood having the improved fastener;

Fig. 2 is a perspective view of a portion of the inside of hood and of the foot-board, parts being shown in section;

Fig. 3 is a section on the line 3—3 of Fig. 1, looking in the direction of the arrows and showing the cam hook in inoperative position; and Fig. 4 is a view similar to Fig. 3, showing the cam hook in locking position.

1 indicates the hood covering the engine and 2 the dash. The hood is provided on its inner side with loops 3, 3, to receive the points of cam hooks 4 pivotally mounted in brackets 5 on the frame or ledge upon which the lower edge of the hood 1 rests. A bar 6 mounted for reciprocating movement in brackets 5 has cam slots 7 to receive end portions 8 of the cam hooks 4 so that when the bar 6 is moved longitudinally in one direction, both hooks 4 will be turned to bring their cam ends 9 into engagement with the loops 3 to draw the hood down to its seat and force its lower edge into contact with the rib 10 on the ledge to prevent rattling.

The bar 6 is moved into locking position by means of a foot piece 11 projecting through a slot in the footboard 12, and is held in the advanced or locking position by means of a dog or other suitable means 13 on the dash or footboard engaging a notch 14 in the bar. A releasing pin 15 may be used to withdraw the dog from the notch 14. A spring 16 is mounted to move the bar 6 longitudinally into inoperative position, such rearward movement acting by the engagement of the cam slots 7 with the ends 8 of the hooks 4 to withdraw the hooks from engagement with the loops 3, thus releasing the hood.

All the mechanism is inside the hood where it is concealed and it is obvious that a suitable lock (not shown) might be provided to prevent unauthorized opening of the hood.

What I claim is:—

1. A locking device for an automobile hood comprising a bar mounted for longitudinal movement, a bracket guiding the movement of the bar, a hooked cam member pivotally mounted on the bracket with a portion of the cam member engaging a cam surface on the bar, and another portion of the cam member adapted to engage a movable member to hold it in locked position.

2. A locking device for an automobile hood comprising a bar mounted for longitudinal movement, a plurality of brackets mounted adjacent to the edge of the hood when in its closed position and guiding the bar in its longitudinal movement, a hooked cam member on each of the brackets, arranged with a portion of the cam member engaging a cam surface on the bar, and another portion adapted to engage means on the hood to draw the hood against its seat and hold it in locked position.

3. A locking device for an automobile hood comprising a bar having a portion thereof within the hood and a portion inside the automobile, and having means engaging locking members arranged on the inside of the hood whereby movement of the bar locks or unlocks the hood, the movements of the bar being controlled from inside the automobile.

4. A locking device for an automobile hood, comprising a longitudinally slidable bar, a plurality of brackets, each having a slot within which said bar is slidably mounted, a crescent-shaped latch member for each of said brackets, having a slot intermediate its ends, a pivot pin upon each of said brackets engaging the slot in a pivoted latch member, said longitudinally slidable bar having a slot therein opposite each bracket, said slot lying at an angle to the longitudinal axis of the bar, the crescent-shaped latch members being mounted upon said pivot pins in such manner that one end of each latch member lies within a diagonally arranged slot in the slidable bar, whereby longitudinal movement of said bar causes pivotal movement of said latch members, and a movable portion of said hood adjacent to said pivoted latch members adapted to be engaged thereby.

In testimony whereof I affix my signature in the presence of two witnesses.

HENRY B. GAPE.

Witnesses:
KENNETH GAPE,
ARTHUR MINNICK.